United States Patent [19]
Galli et al.

[11] Patent Number: 5,975,548
[45] Date of Patent: *Nov. 2, 1999

[54] VEHICLE WITH PIVOTING MUDGUARD

[75] Inventors: Maurizio Galli, Capri; Pier L. Pertusi, Campogalliano, both of Italy

[73] Assignee: New Holland North America, Inc., New Holland, Pa.

[*] Notice: This patent is subject to a terminal disclaimer.

[21] Appl. No.: 08/932,269

[22] Filed: Sep. 17, 1997

[30] Foreign Application Priority Data

Sep. 27, 1996 [IT] Italy .................................. TO96A0790

[51] Int. Cl.⁶ .................................................. B62D 25/18
[52] U.S. Cl. ........................... 280/157; 280/156; 296/198
[58] Field of Search ..................... 280/157, 156, 280/854, 847, 848, 849, 900, 760, 853, 152.5, 154; 296/198; 172/112, 508, 509; 246/299

[56] References Cited

U.S. PATENT DOCUMENTS

| | | | |
|---|---|---|---|
| 415,021 | 11/1889 | Brown | 280/157 |
| 5,074,573 | 12/1991 | Dick | 280/157 |
| 5,169,167 | 12/1992 | Willson et al. | 280/157 |
| 5,511,808 | 4/1996 | Rowland | 280/157 |
| 5,794,956 | 8/1998 | Hurlburt et al. | 280/156 |

FOREIGN PATENT DOCUMENTS 2595313  3/1987  France .

*Primary Examiner*—Lanna Mai
*Assistant Examiner*—James S. McClellan
*Attorney, Agent, or Firm*—Larry W. Miller; J. William Stader; Frank A. Seemar

[57] ABSTRACT

A vehicle is disclosed having a hub assembly for a steerable wheel mounted for pivoting movement relative to an axle about a first axis. A mudguard is mounted for pivotal movement relative to the axle (or the hub assembly) about a second axis offset from the first axis. A linkage acting on the mudguard, the axle and the hub assembly rotates the mudguard about the second axis in response to and in synchronism with the pivoting of the hub assembly about the first axis so as to cause the position of the mudguard relative to the wheel to vary with the steering angle.

15 Claims, 15 Drawing Sheets

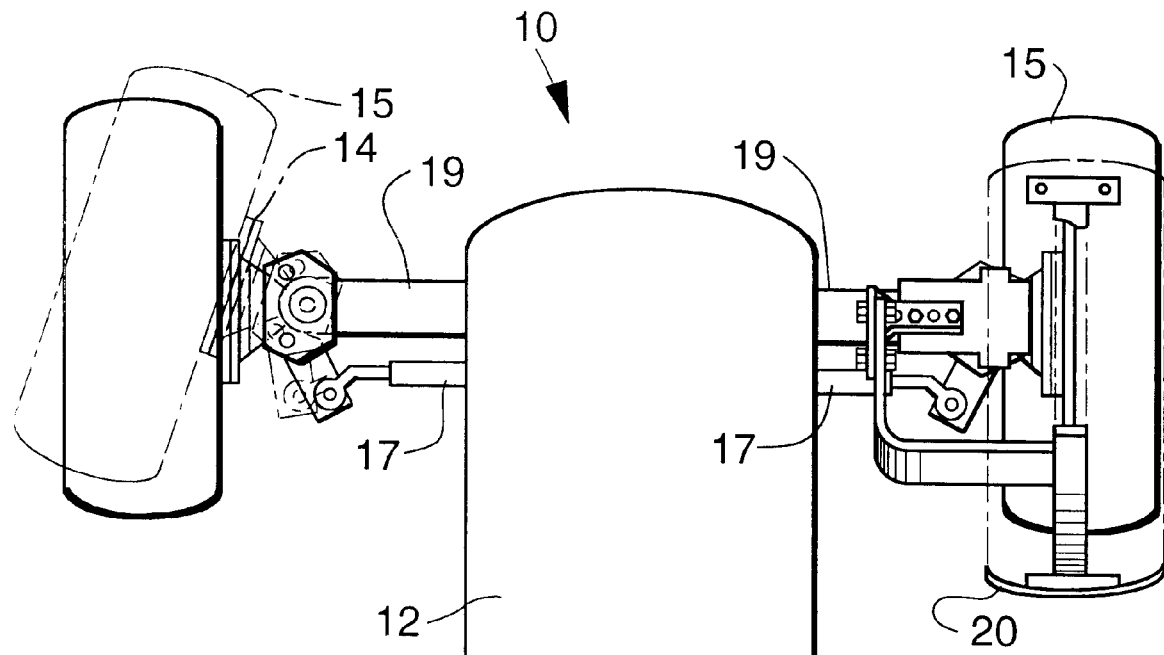
Fig. 1
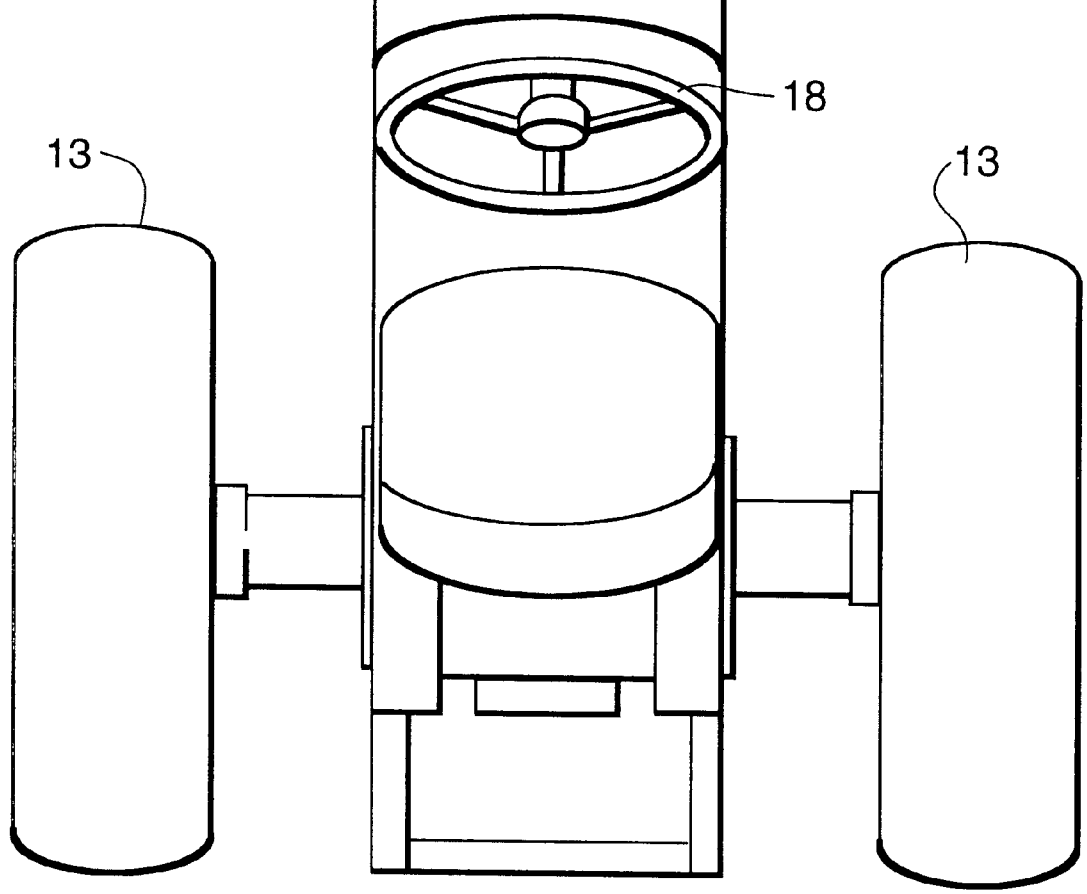

VEHICLE WITH PIVOTING MUDGUARD

BACKGROUND OF THE INVENTION

The present invention relates to a vehicle having a hub assembly for a steerable wheel mounted for pivoting movement relative to an axle of the vehicle and a mudguard or fender for the wheel that is mounted for pivotal movement with the wheel hub assembly relative to the axle.

Agricultural tractors, such as those shown in U.S. Pat. No. 5,169,167 are powered for movement over the ground, and may be steered in a conventional manner by pivoting the front wheels relative to the front axle on which the front wheels are rotatably mounted about a king pin axis. Steering mechanisms are well known in the vehicle art, the geometry of which is such that the inboard front wheel on any particular turn is pivoted at a greater angle than the outboard front wheel. One skilled in the art will understand that tractor wheels are capable of being mounted on the tractor in various locations to permit the transverse spacing between the front, as well as the rear, wheels to be varied according to the spacing between the rows of crop material through which the tractor is to be run.

As taught in the aforementioned U.S. Pat. No. 5,169,167, the front wheels are often covered with a mudguard mechanism to prevent the spraying of material from the tire. The mudguard mechanisms may be mounted in an adjustable manner so that the mudguard can be properly positioned relative to the corresponding tire to provide the desired protection. Under certain conditions, such as when the front wheels are set at a relatively narrow transverse spacing, the mudguard mechanism, which projects generally upwards and rearward from the corresponding front wheel, can impact the chassis of the tractor during hard turns. This is particularly true for the inboard front wheel on a hard turn due to the greater angular rotation of the inboard wheel relative to the front axle.

Mechanisms have been devised to effect a pivotal rotation of the mudguard mechanism relative to the corresponding wheel to move the mudguard out of the way of the chassis during hard turns of the tractor. One such mechanism can be found in U.S. Pat. No. 5,074,573, which uses a spring to mount the mudguard to the corresponding front wheel. A stop member supported by the chassis engages the spring-loaded mudguard assembly to pivot the mudguard assembly relative to the inboard front wheel once the latter wheel has rotated a given amount. The mudguard spring returns the mudguard to its normal position after the front wheels have been rotated sufficiently to disengage the mudguard from the stop.

There is also known a mechanism that utilizes a spring-loaded mudguard mechanism in which the stop is eliminated so that the mudguard directly engages with the tractor chassis to effect a pivotal movement of the mudguard relative to the corresponding wheel. While both of these mechanisms serve to protect the mudguard and chassis from major damage due to a non-yielding mudguard, the rubbing engagement between the mudguard and the chassis requires special protective plates to prevent minor damage to the paint and finish of both the mudguard and the tractor chassis.

In order that the mudguard should not restrict the steering lock, it has further been proposed in FR-A-2.595.313, to provide a complex four-lever linkage anchored at different points on the hub assembly, on the mudguard and on the vehicle axle to cause the mudguard to pivot through a lesser angle than the hub assembly but about the same axis. In this case, the reliability of the linkage is suspect because of its many pivot points. It also sweeps through a large area as the wheel is steered, thus taking up a large amount of space.

SUMMARY OF THE INVENTION

The present invention therefore seeks to provide a vehicle having a simple, compact and reliable linkage to allow a mudguard to move with a steerable wheel without restricting the steering lock by avoiding collision between the mudguard and the vehicle chassis or body.

According to a first aspect of the present invention, there is provided a vehicle having a hub assembly for a steerable wheel mounted for pivoting movement relative to an axle about a first axis, a mudguard pivotably mounted on the hub assembly, and a linkage connected to the mudguard, to the axle and to the hub assembly for pivoting the mudguard relative to the hub assembly in response to the pivoting of the hub assembly relative to the axle but at a different rate, so as to cause the angular position of the mudguard relative to the hub assembly to vary with the angle of the hub assembly relative to the axle.

The arrangement is characterized in that the mudguard is pivotable relative to the hub assembly about a second axis which is laterally offset from the first axis.

According to a second aspect of the present invention, there is provided a vehicle having a hub assembly for a steerable wheel mounted for pivoting movement relative to an axle about a first axis, a mudguard pivotably mounted on the axle, and a linkage connected to the mudguard, to the axle and to the hub assembly for pivoting the mudguard relative to the axle in response to the pivoting of the hub assembly relative to the axle but at a different rate, so as to cause the angular position of the mudguard relative to the hub assembly to vary with the angle of the hub assembly relative to the axle.

The arrangement is characterized in that the mudguard is pivotable relative to the axle about a second axis which is laterally offset from the first axis.

In the first aspect of the invention, the pivotal axis of the mudguard, i.e. the second axis, is fixed in relation to the hub assembly whereas in the second aspect the mudguard is pivotable about an axis which is fixed relative to the axle. Both aspects of the invention however rely on the same principle of mounting the mudguard to pivot about an axis that is offset from the axis of the kingpins and to use a suitable linkage acting on the mudguard, the hub assembly and the axle to cause the mudguard and the hub assembly to move together but at different rates.

The linkage may suitably comprise a lever connected to pivot with the mudguard, the lever being pivotably mounted at one end on the axle or the hub assembly, and coupled at its other end to the hub assembly or the axle, respectively, by means of a coupling element capable of accommodating some free movement in the longitudinal direction of the lever as the lever rotates about the second axis.

The coupling element may be in the form of a coupling bolt attached to the lever and slidably engaging in a groove fixed relative to the hub assembly or the vehicle chassis, as the case may be.

In order to be able to adjust the movement of the mudguard, it is preferred for the position of the coupling bolt along the lever to be adjustable. To this end, the base of the coupling bolt may be in the form of a circle with two flats, and the coupling bolt may be receivable in any one of a plurality of positions along a slot in the lever having scalloped edges.

In further embodiments of the invention, the coupling element may itself be a second lever, pivotably connected at one end to the lever connected to pivot with the mudguard, and pivotably mounted at its other end on the chassis or the hub assembly, depending on whether the mudguard is pivotably supported on the hub assembly or the chassis. Preferably, the lever arrangement effects a greater amount of pivotal movement of the mudguard during an inboard turn than during an outboard turn, and is therefore particularly adaptable to the steering movements of a tractor equipped with a compound steering mechanism.

BRIEF DESCRIPTION OF THE DRAWINGS

FIG. 1 is a top plan view of an agricultural tractor showing the environment on which the present invention is applicable;

DETAILED DESCRIPTION OF THE PREFERRED EMBODIMENT

Figure 2:
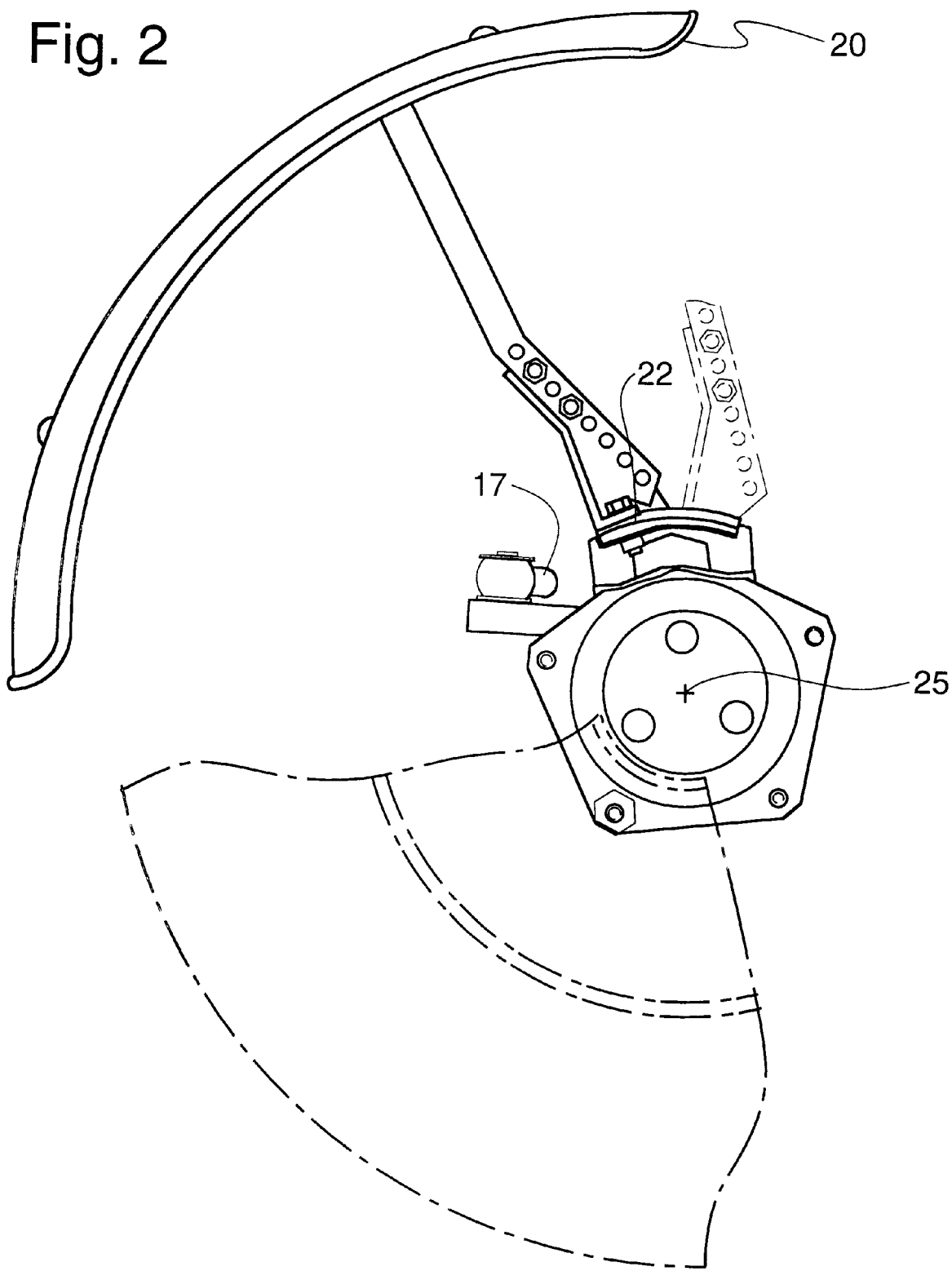
FIG. 2 is a side elevation of a prior art mounting of a mudguard mechanism in a manner to be adjustable relative to the corresponding front wheel.
Figure 3A:
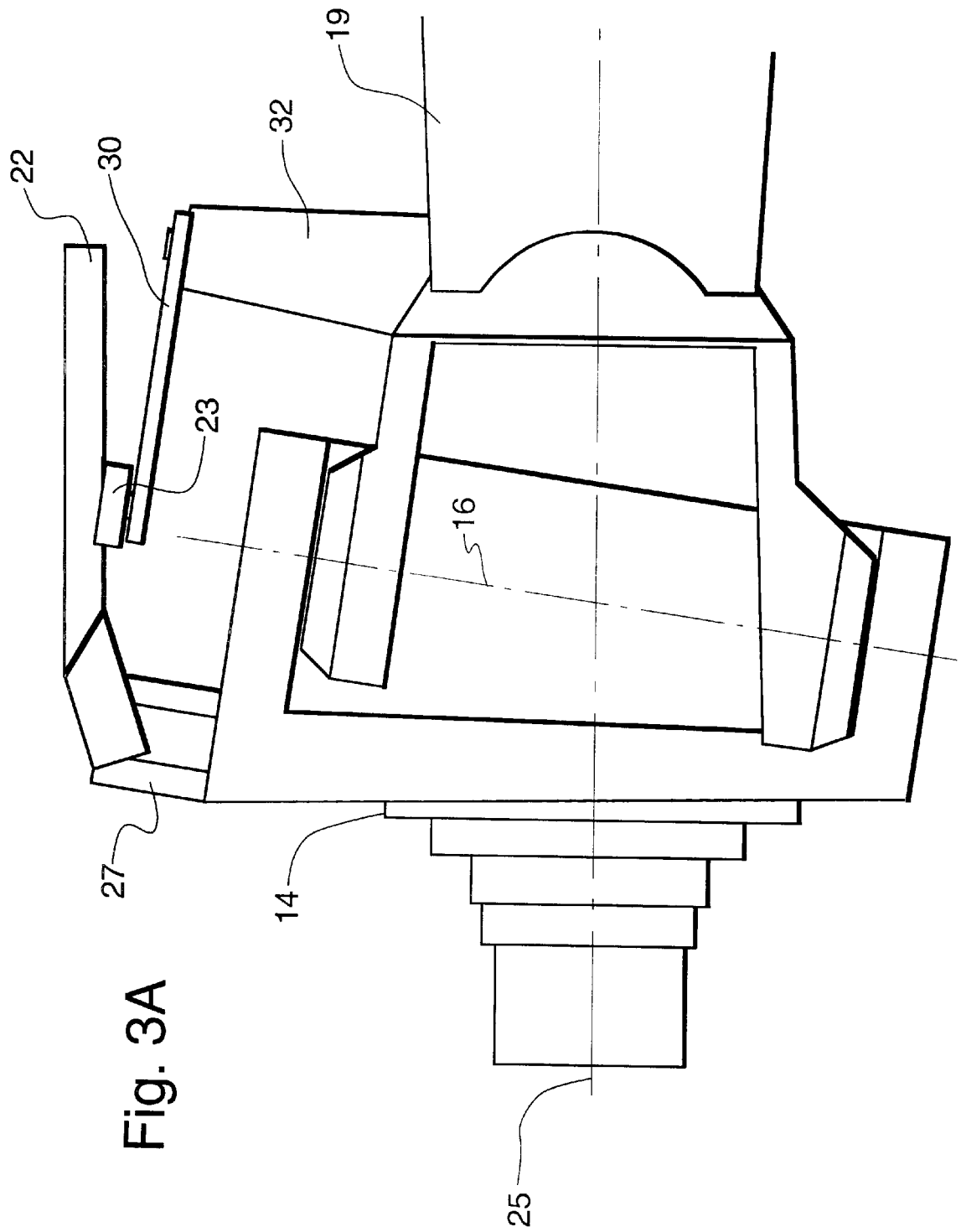
FIG. 3A is an enlarged rear elevation of the mudguard pivot control mechanism of an embodiment of the invention for the left front wheel of the tractor, the components being oriented in a no-turn, straight-ahead configuration.
Figure 3B:
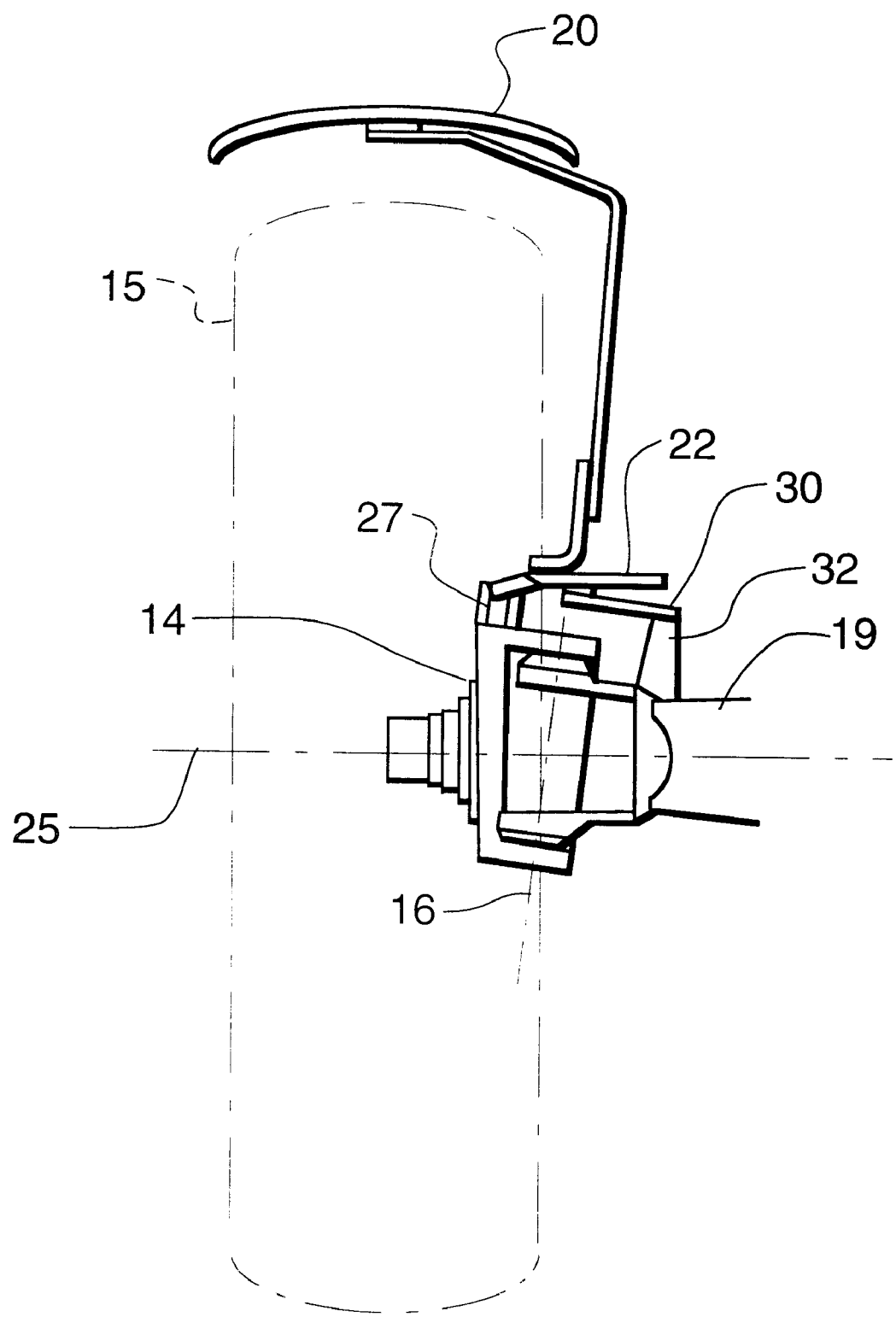
FIG. 3B is a rear elevation of a mudguard pivot control mechanism similar to that of FIG. 3A, drawn to a reduced scale to show the relationship between the mudguard pivot control mechanism and the front axle and mudguard, the corresponding wheel being shown in phantom.
Figure 4A:
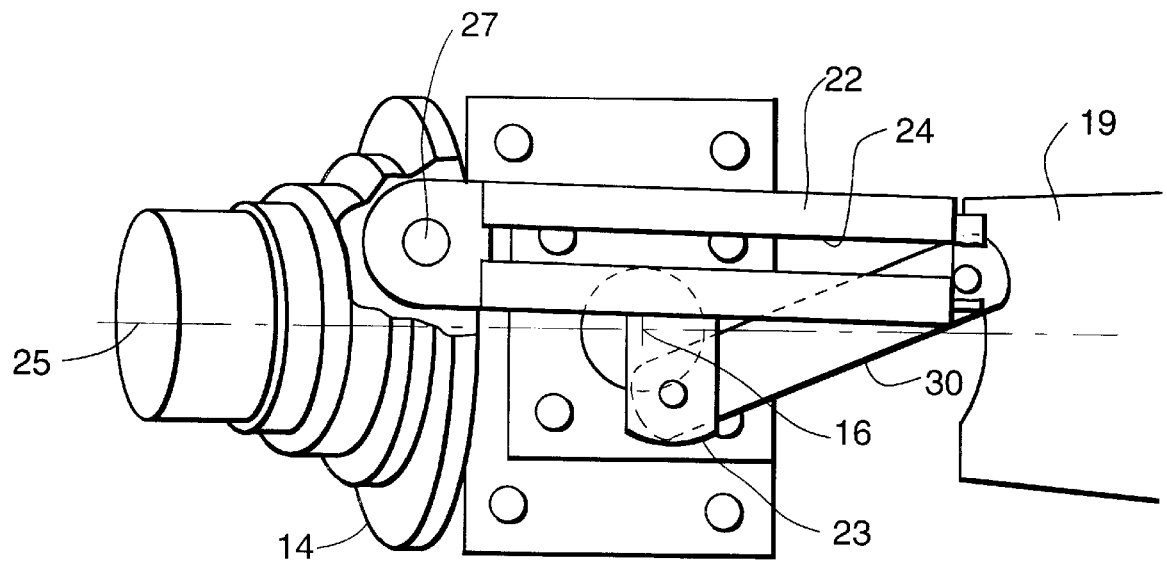
FIG. 4A is an enlarged top plan view of the mudguard control mechanism shown in FIG. 3A.
Figure 4B:
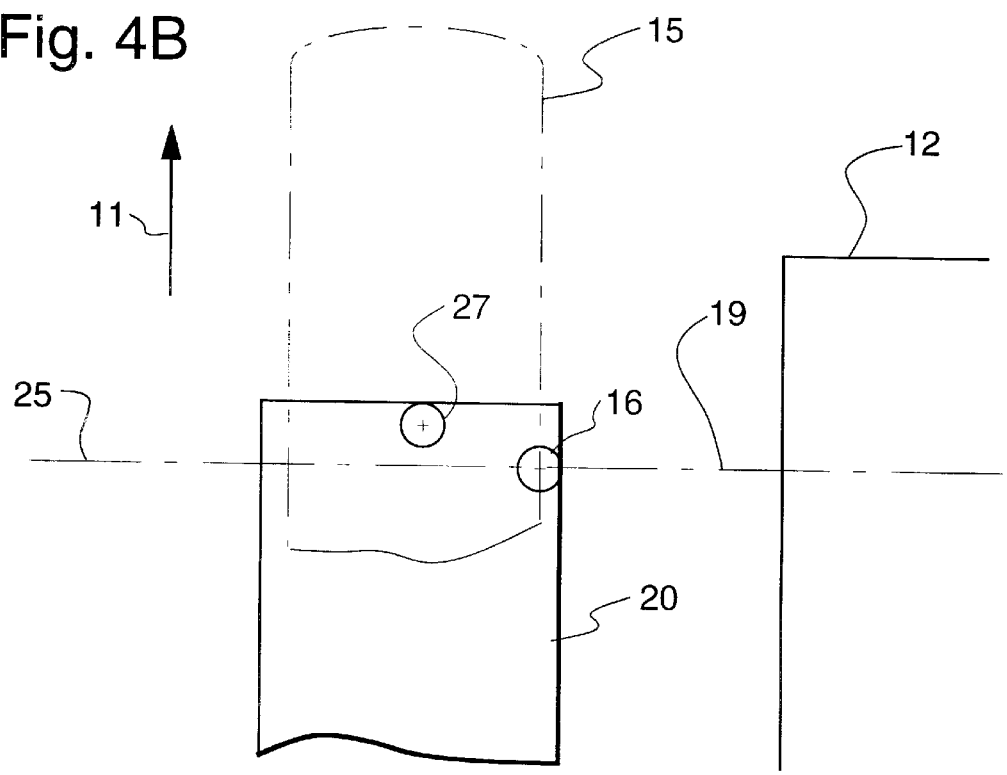
FIG. 4B is a schematic plotting of the pivot centers, front axle, mudguard and tractor chassis corresponding to the view of FIG. 4A to depict the relative relationship therebetween, the forward direction of travel being shown by an arrow.

In the following description of FIGS. 1–6B, references to "left" and "right" are used as a matter of convenience and are determined by standing at the rear of the tractor facing forwards into the normal direction of travel (which in some of the drawings is indicated by arrow 11). For purposes of clarity with respect to depicting the steering movement of the wheel 15, the left front wheel 15 in FIG. 1 is depicted without a mudguard 20, while the right front wheel 15 is shown with a mudguard 20. FIGS. 3A–6B, 8 and 9 show only the left front wheel 15 and associated mudguard 20 but it will be clear that the construction of the opposing wheel will be the mirror image. Obviously, the left and right front wheels 15 operate simultaneously through the conventional tractor steering mechanism 17.

FIG. 1 shows a conventional tractor and FIG. 2 shows in more detail a known mechanism for adjusting the fixed position of the mudguard 20 relative to the wheel. The agricultural or industrial tractor 10 is supported for movement over the ground by a pair of rear driven wheels 13 and a pair of opposing steerable front wheels 15. The steerable wheels 15 are pivotable in a conventional manner relative to the front axle 19 about the axis of the king pins (designated 16 in FIGS. 3a & 3B). Rotation of the front wheels 15 relative to the front axle 19 is accomplished in a conventional manner by the steering mechanism 17. Typically, the front mudguards 20 are supported from the corresponding wheel structure so as to be rotatable therewith relative to the front axle 19. The mudguards 20 can be adjustably mounted relative to the corresponding front wheel 15 in the manner shown in FIG. 2, so that the mudguard 20 can be positioned relative to the corresponding front wheel 15 in the most desirable orientation relative thereto. In particular, the distance of the mudguard from the wheel axis 25 can be modified by repositioning the mudguard on its mounting bracket, and the angular position of the latter bracket relative to the wheel hub assembly can be changed by repositioning the bracket on its base 22, as represented by the dotted lines in FIG. 2. Greater details of this adjustable mounting of the mudguard 20 can be found in U.S. Pat. No. 5,169,167, the description of which is incorporated herein by reference.

Referring now to FIGS. 3A–6B, the mudguard 20 in a first embodiment of the invention is mounted on a mudguard base 22 which is provided with a slot 24 to permit the variable positioning of the mudguard 20 transversely. Adjustable positioning of the mudguard 20 relative to the rotational axis 25 of the corresponding front wheel 15 requires an intermediate bracket, not shown, to allow movement of the mudguard 20 relative to the mudguard base 22. The variable positioning of the front mudguard 20 relative to the corresponding front wheel 15 is not considered to be crucial to the present invention and will not be described further.

The mudguard base 22 is pivotally supported by a mudguard pivot 27 on a spuckle, the latter being a casting that forms part of the hub assembly 14 on which is rotatably mounted the hub of the front wheel 15. The hub assembly 14 can pivot relative to the front axle 19 about the kingpin axis 16. Accordingly, the mudguard pivot 27 is rotated with the hub assembly 14 about said kingpin axis 16. A control link 30 is pinned at one end to an axle housing pivot 32 forming a part of the front axle 19. The opposing end of the control link 30 is pivotally connected to the mudguard base 22 at a position spaced inboard of the mudguard pivot 27. The mudguard base 22 is formed with a link pivot member 23 that projects outwardly therefrom for pivotal connection to the control link 30 beneath the mudguard base 22 so as to not interfere with the mounting of the mudguard 20 to the mudguard base 22.

One skilled in the art will readily recognize that the location of the link pivot member 23 relative to the mudguard pivot 27 provides the appropriate geometry for the rotation of the mudguard 20 differently on inboard versus outboard turns. Preferably, the mudguard pivot 27 is located outboard of the kingpin axis 16, while the link pivot member 23 is positioned inboard and rearward of the kingpin axis 16. This configuration provides the mudguard lag, i.e. the rotation of the mudguard 20 relative to the rotation of the corresponding front wheel 15 about the kingpin axis 16, as graphically depicted in FIG. 7.

Figure 5A:
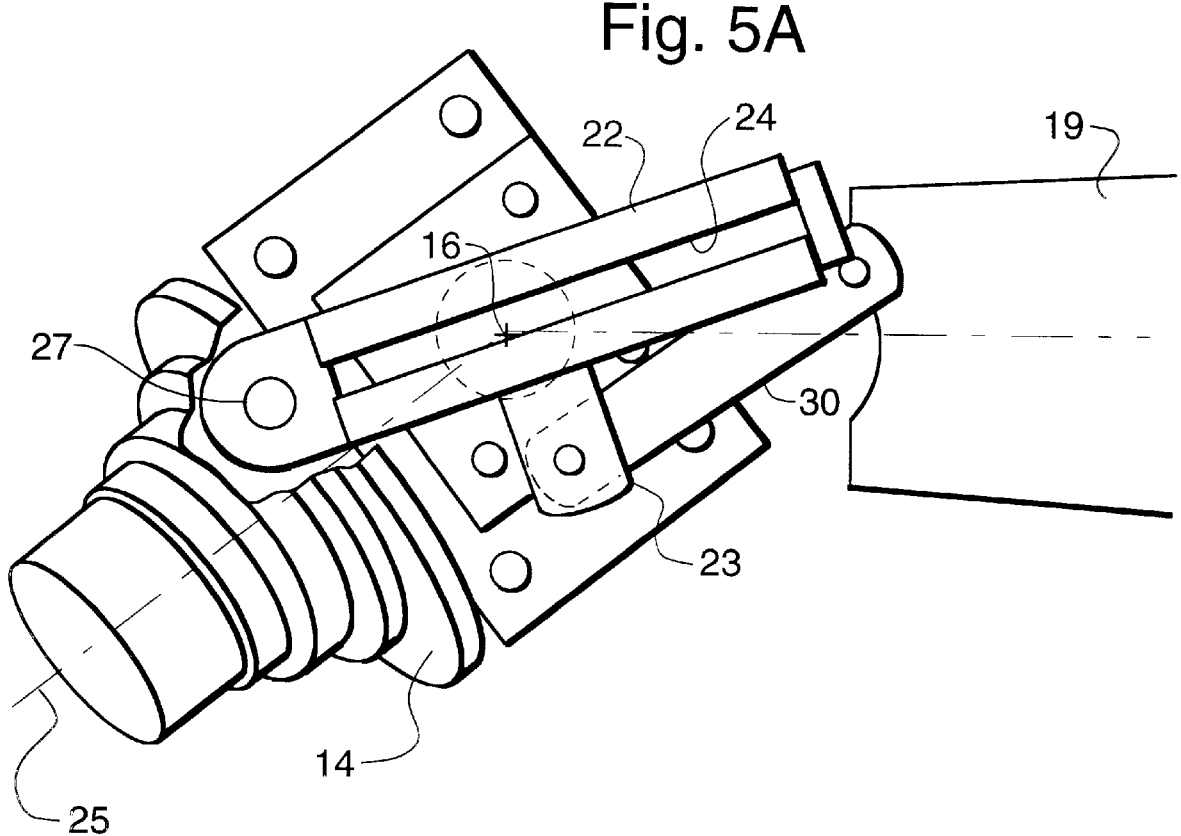
FIG. 5A is an enlarged top plan view of the mudguard control mechanism, similar to that of FIG. 4A except that the left front wheel has been rotated to effect a left turn so that the left front wheel becomes the inboard wheel on the turn.
Figure 5B:
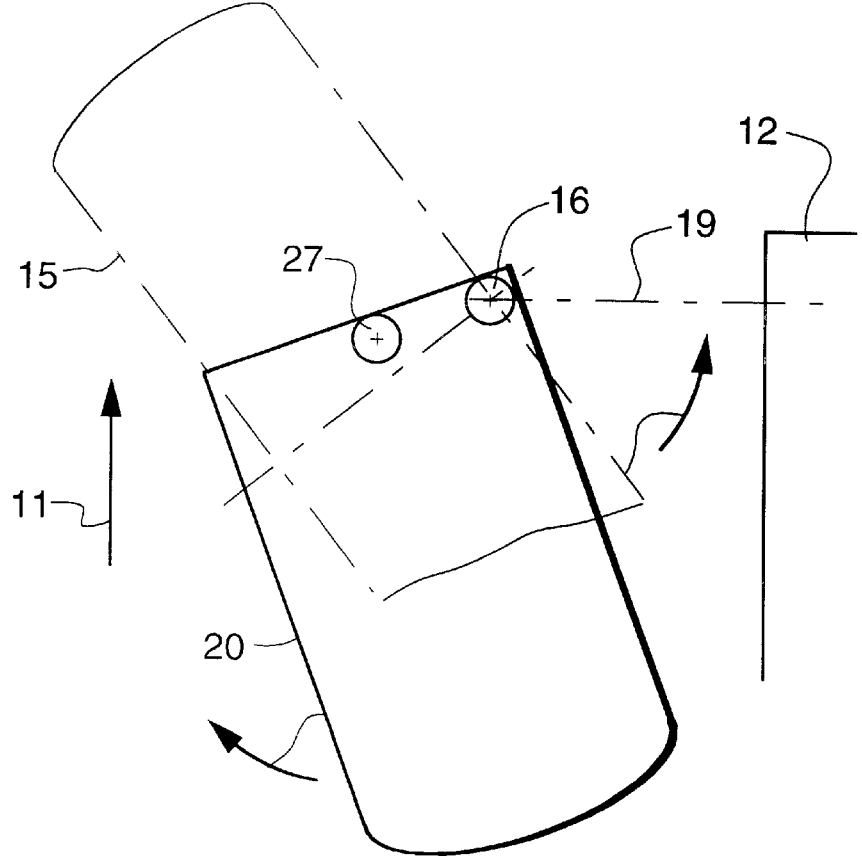
FIG. 5B is a schematic plotting similar to that of FIG. 4B, except corresponding to the view of FIG. 5A with the left front wheel undertaking a left hand turn.
Figure 6A:
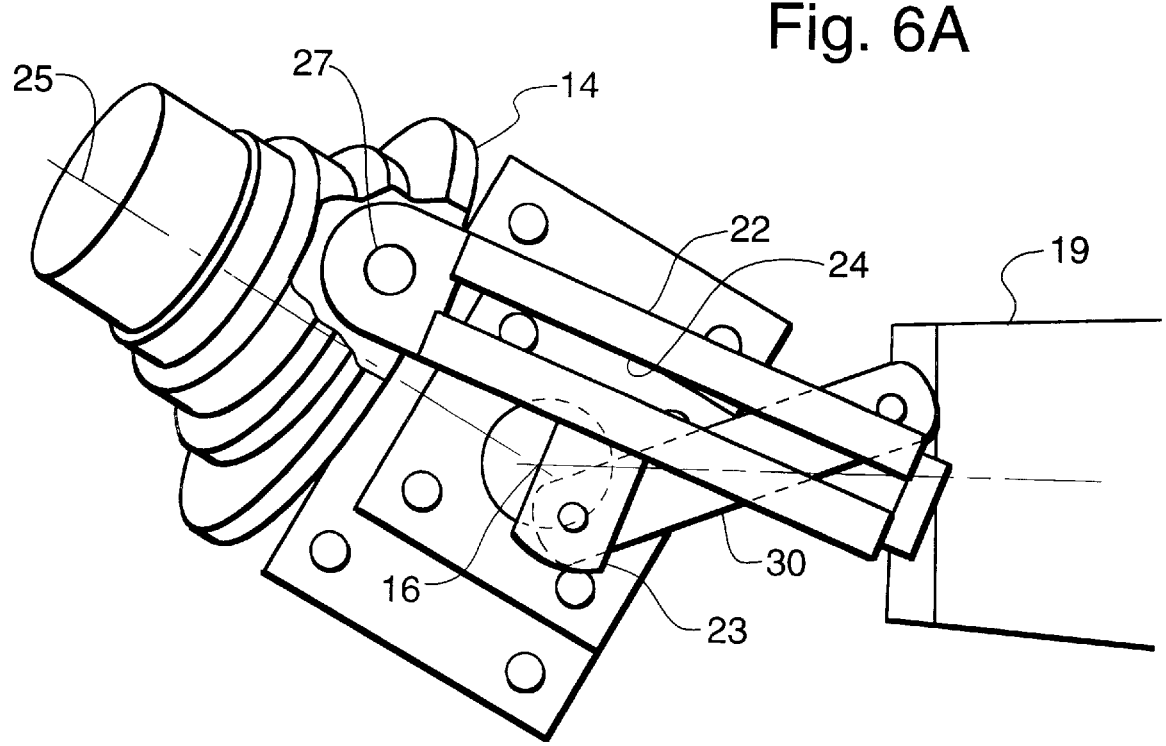
FIG. 6A is an enlarged top plan view of the mudguard control mechanism, similar to that of FIG. 4A except that the left front wheel has been pivoted to effect a right turn so that the right wheel becomes the outboard wheel on the turn.
Figure 6B:
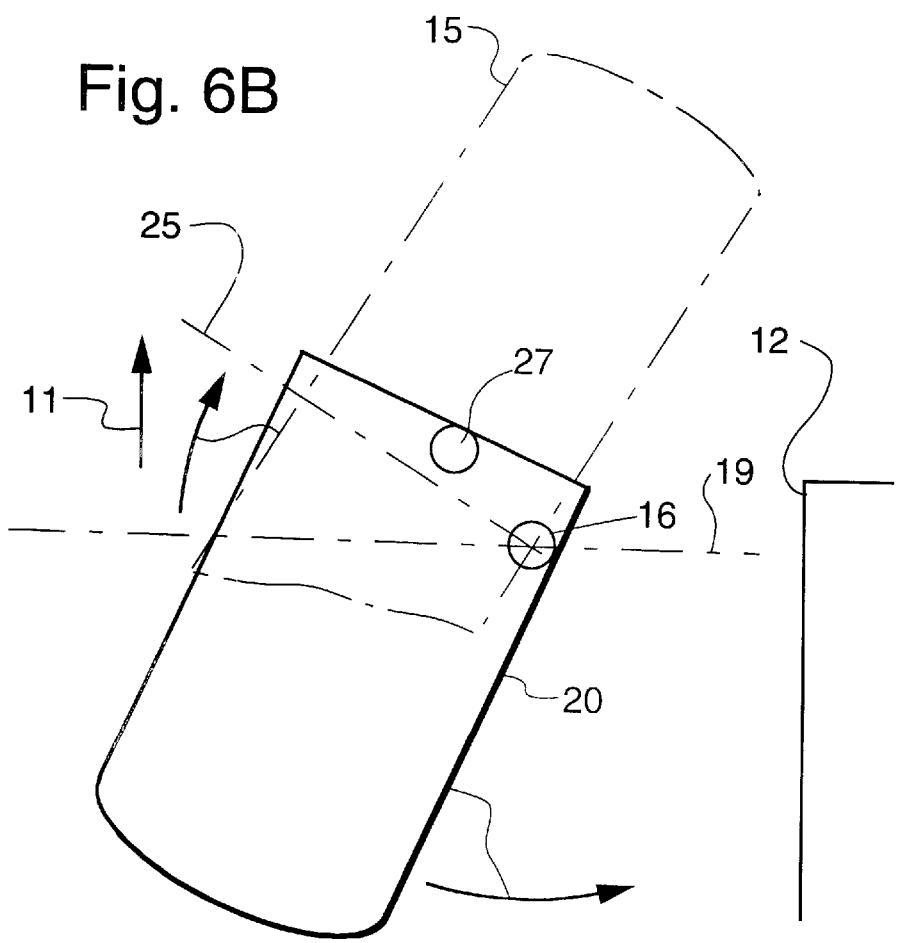
FIG. 6B is a schematic plotting similar to FIGS. 4B and 5B, except corresponding to the view of FIG. 6A with the left front wheel undertaking a right hand turn.

As is best seen in FIGS. 5A through 6B, the rotation of the front wheel 15 about the kingpin axis 16 carries the mudguard pivot 27 with the front wheel 15. The relative locations of the front wheel 15 and mudguard 20 relative to the chassis 12 are depicted in FIGS. 5B and 6B, as is the forward direction of travel which is indicated by the arrow 11. The control link 30, however, defines a fixed distance between the link pivot member 23 and the axle housing pivot 32 and will not allow the mudguard base 22 to rotate completely with the hub assembly 14. The control link 30, therefore, effects rotation of the mudguard base 22 about the mudguard pivot 27, effectively decreasing the angular rotation of the mudguard base 22 about the kingpin axis 16 as a function of the angular rotation of the hub assembly 14 and front wheel 15 about the kingpin axis 16. Because the link pivot member 23 is moved away from the kingpin axis 16 on an inboard turn, as depicted in FIGS. 5A and 5B, as opposed to being drawn toward the kingpin axis 16 on an outboard turn, as depicted in FIGS. 6A and 6B, the mudguard lag is greater on the inboard turn than on the outboard turn.

Figure 7:
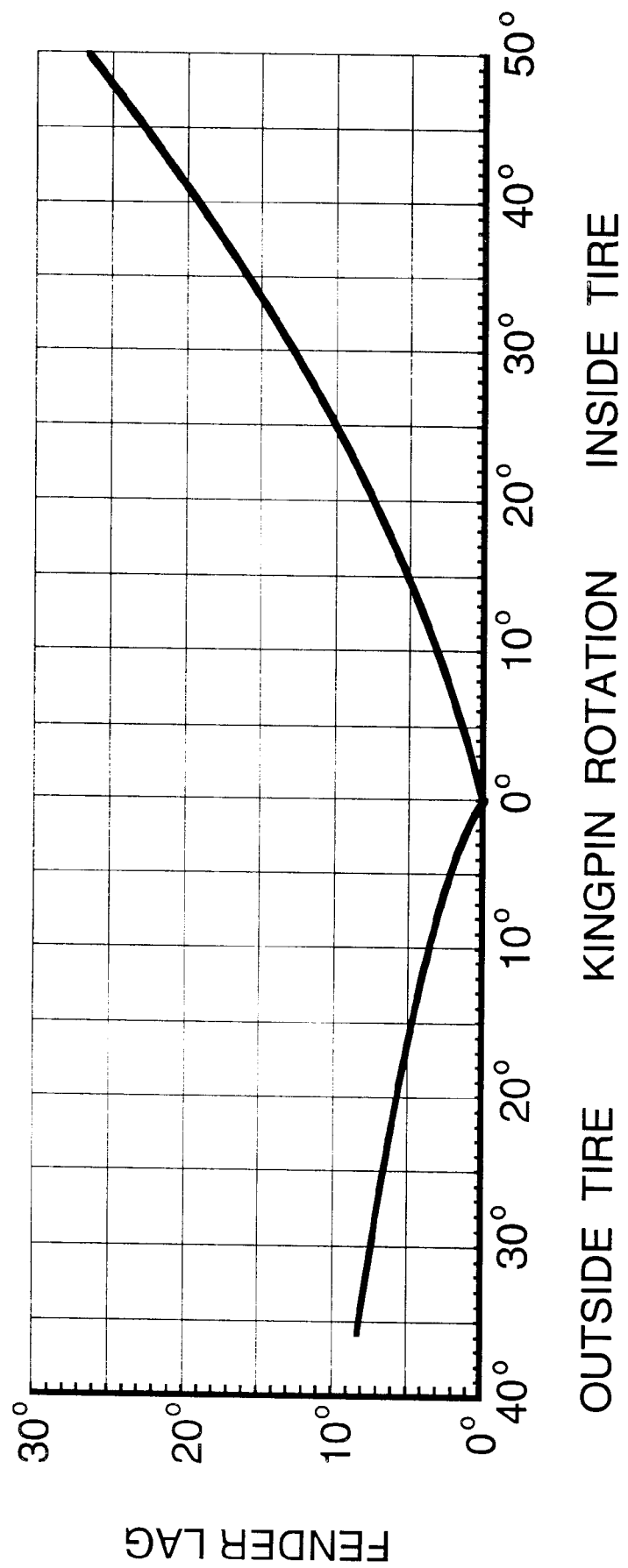
FIG. 7 is a graph plotting the pivotal movement of the mudguard, identified as "FENDER LAG", relative to the rotation of the corresponding front wheel, identified as "KINGPIN ROTATION", under the conditions of an inboard wheel, identified as the "INSIDE TIRE", and of an outboard wheel, identified as the "OUTSIDE TIRE"

The relative mudguard lag is depicted in FIG. 7 as a graph showing variation of the fender lag with rotation of the wheel hub assembly about the kingpin axis 16. One skilled in the art will readily see that the mudguard lag in terms of degrees of rotation is greater for a given amount of angular rotation on an inboard turn than for the same amount of angular rotation on an outboard turn. Furthermore, the total amount of angular rotation for the front wheel 15 about the kingpin axis 16 on an inboard turn is greater than the simultaneous angular rotation of the opposing front wheel 15 undergoing an outboard turn.

As a result, the mudguard 20 moves toward the tractor chassis 12 slower than the corresponding front tire 15 and effectively pivots away from the chassis 12 during turns without requiring an engagement between the mudguard 20 and the chassis 12. The relative movement of the mudguard 20 and the corresponding front wheel 15 on outboard turns is such that the rear of the mudguard 20 lags closer to the chassis 12 than the tire 15 on outboard turns, as opposed to inboard turns wherein the tire 15 rotates more toward the chassis 12 than the rear of the mudguard 20. It will be appreciated that the control of the front part of the mudguard 20 on outboard turns is as important as controlling the rear of the mudguard 20 on inboard turns as the primary goal is to prevent the mudguard from impacting the chassis 12. Since the greater chance of impact between the chassis 12 and the mudguard 20 occurs during the inboard turns, the geometry of the components permits a greater amount of mudguard lag for inboard turns.

Figure 8:
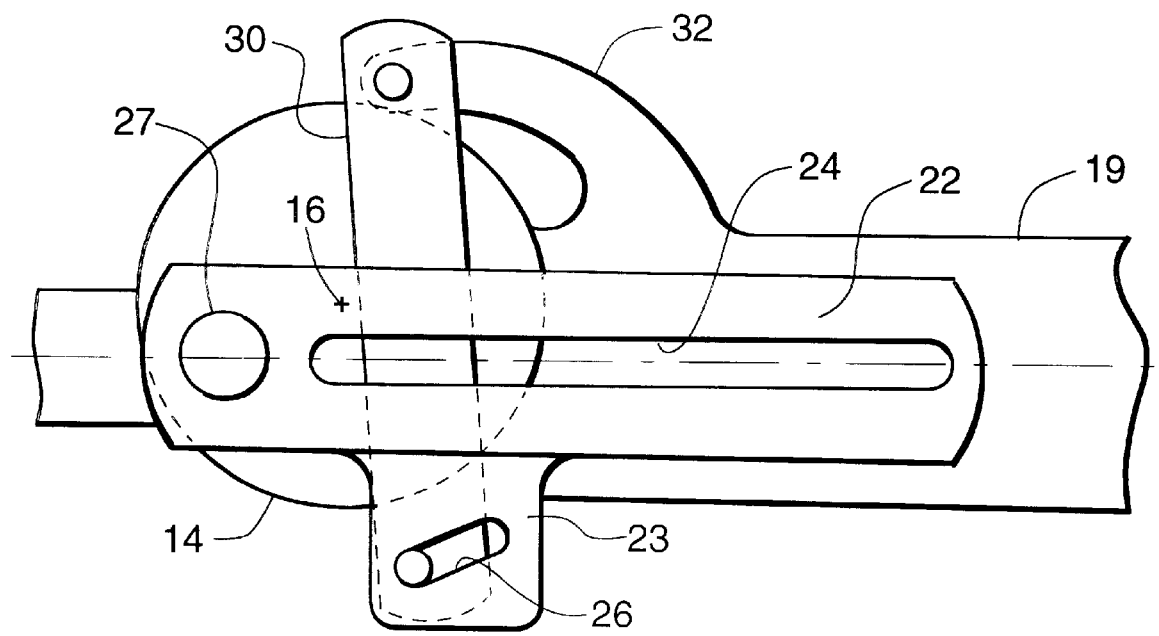
FIG. 8 is an enlarged top plan view of an alternative configuration of the mudguard pivot control mechanism similar to the view of FIG. 4A, depicting the left front wheel of the tractor.
Figure 9:
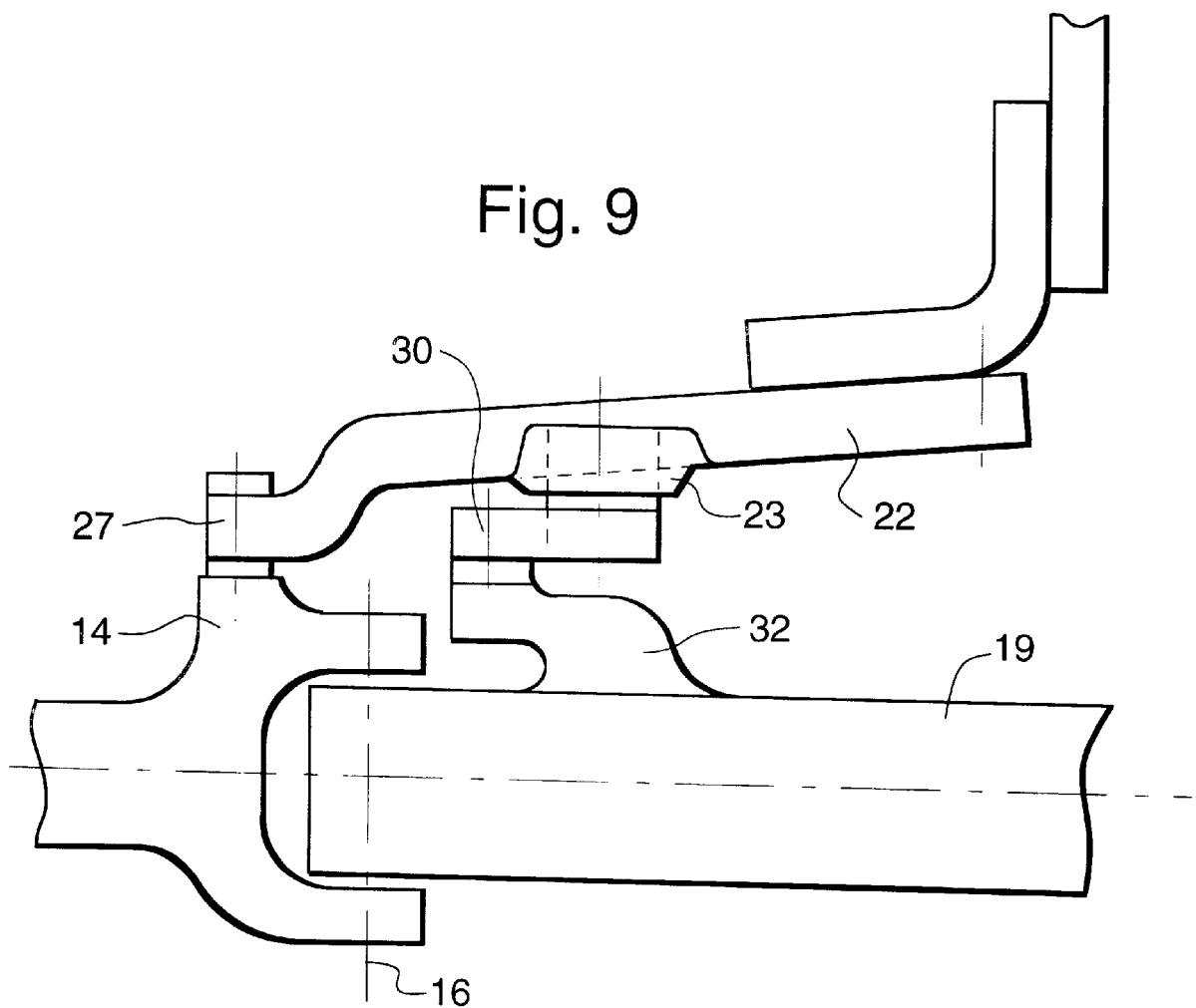
FIG. 9 is a rear elevation of the alternative configuration shown in FIG. 8.

An alternative configuration of the control link 30 is shown in FIGS. 8 and 9. The orientation of the link pivot member 23 and the mudguard pivot 27 are essentially the same as described above with respect to the embodiment in FIGS. 3A–6B. The control link 30, however, is oriented substantially longitudinally with respect to the direction of travel of the tractor 10, as opposed to the substantially transverse orientation described above with respect to the embodiment of FIGS. 3A–6B.

The connection between the control link 30 and the link pivot member 23 incorporates a short slot 26, preferably formed in the link pivot member 23. This short slot 26 provides a limited amount of lost motion between the control link 30 and the mudguard base 22 so that the mudguard 20 can be allowed to move fully with the corresponding front wheel 15 during slight inboard turns, which may provide some greater control over the discharge of material from the tire until the front wheels 15 exceed a predetermined amount of angular turn. Although not shown in the drawings, a spring may be preferable to control the utilization of the short slot 26 in this manner.

The short slot 26 permits relocation of the connection point between the control link 30 and the link pivot member 23, placing this connection point further away from the mudguard pivot 27. This change in geometry will result in an increased amount of mudguard lag for each increment of angular turn of the wheel 15 about the kingpin axis 16. This increased mudguard lag is advantageous for narrow transverse spacing between the front wheels 15 as the mudguard 20 is closer to the chassis 12 than when a wider transverse spacing is provided between the front wheels 15.

Figure 10:
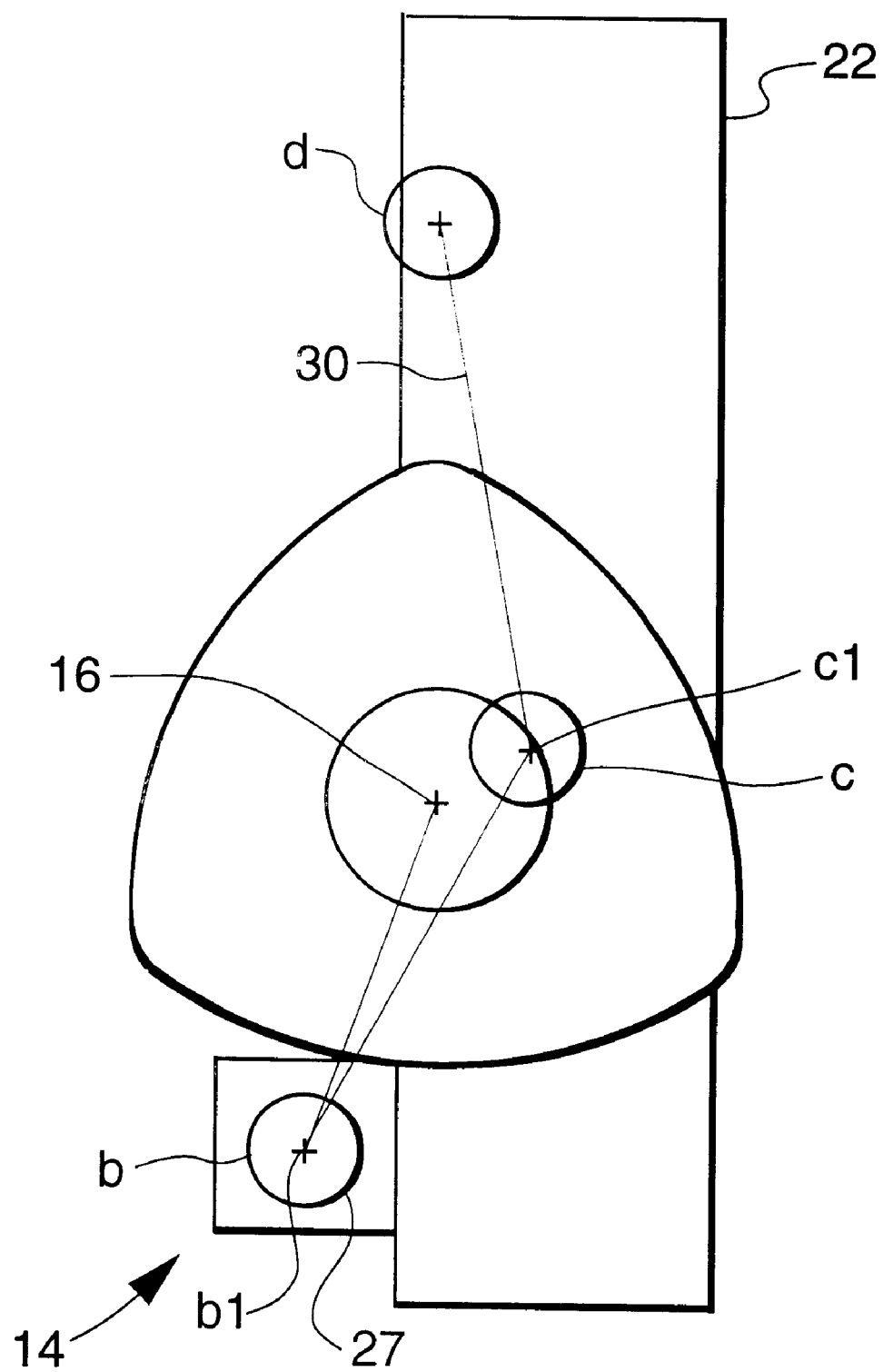
FIG. 10 is a top view of another alternative embodiment taken perpendicular to the kingpin axis.
Figure 11:
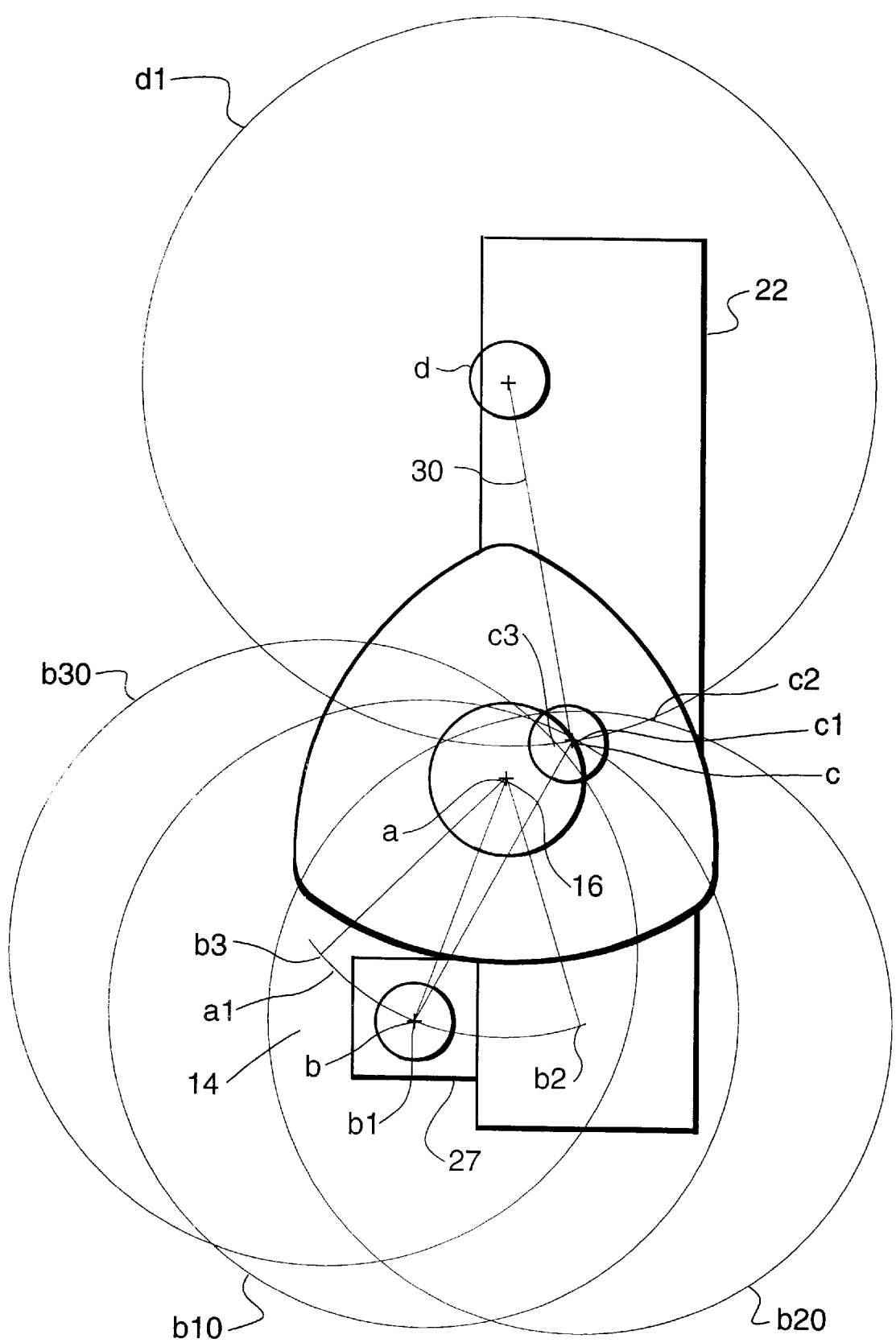
FIG. 11 is a view similar to that of FIG. 10, but demonstrating movement of the wheel in both the inboard and outboard turns.

In the embodiment depicted in FIGS. 10 and 11, the control link 30 is pivotally connected to the front axle 19 at a connection point d beneath the mudguard base 22 and extends upwardly therefrom to pin to a pivotal connection c1 in the middle of the mudguard base 22. The connection point c1 is located to the rear and inboard of the kingpin axis 16 to provide the appropriate geometry as described above. The mudguard base 22 is again pivotally connected to the hub assembly 14 at point b which moves with the hub assembly 14 through the arc a1 during the turns of the corresponding front wheel 15. Arc b10 corresponds to the straight-ahead position of the hub assembly 14, while arc b20 represents a full inboard turn and arc b30 represents a full outboard turn. The connection point c1, in turn, moves along arc d1 to point c2 at the full inboard turn and to point c3 on the full outboard turn.

More specifically, the mudguard base 22 pivots about mudguard pivot 27 at point b on the hub assembly 14. When the hub assembly 14 is steered about the kingpin axis 16, the pivot b moves along arc a1. As the hub assembly 14 is rotated 35 degrees inboard, pivot b moves from position b1 to position b2. Simultaneously, the opposing hub assembly 14 is rotated 25.7 degrees outboard, which is represented on the drawing for purposes of convenience at position b3. Connection point c is located on the mudguard base 22 and moves therewith.

Circles b10, b20 and b30 represent in FIG. 11 the paths that connection point c could possibly move about respective axes b1, b2 and b3. However, the movement of the mudguard base 22 is also controlled by the control link 30, which is pivotally fixed on the axle 19; therefore, point c must move on arc d1. Thus, point c is always located at the intersection of circle d1 and the movable arc represented by the circles b10, b20 and b30. By studying the circles, one skilled in the art can determine the relationship of the components in the event the circle sizes or centers were changed. The depicted geometry causes the mudguard to rotate 14.9 degrees (measured between the respective lines connecting point b1 with point c1 and point b2 with point c2) when the hub assembly 14 is rotated inboard 35 degrees. The corresponding outboard rotation of the hub assembly 14 through 25.7 degrees of outboard steer moves the mudguard 19.1 degrees (measured between the respective lines connecting point b1 with point c1 and point b3 with point c3). These relative amounts of mudguard lag can be changed by adjusting the linkage geometry.

Figure 12:
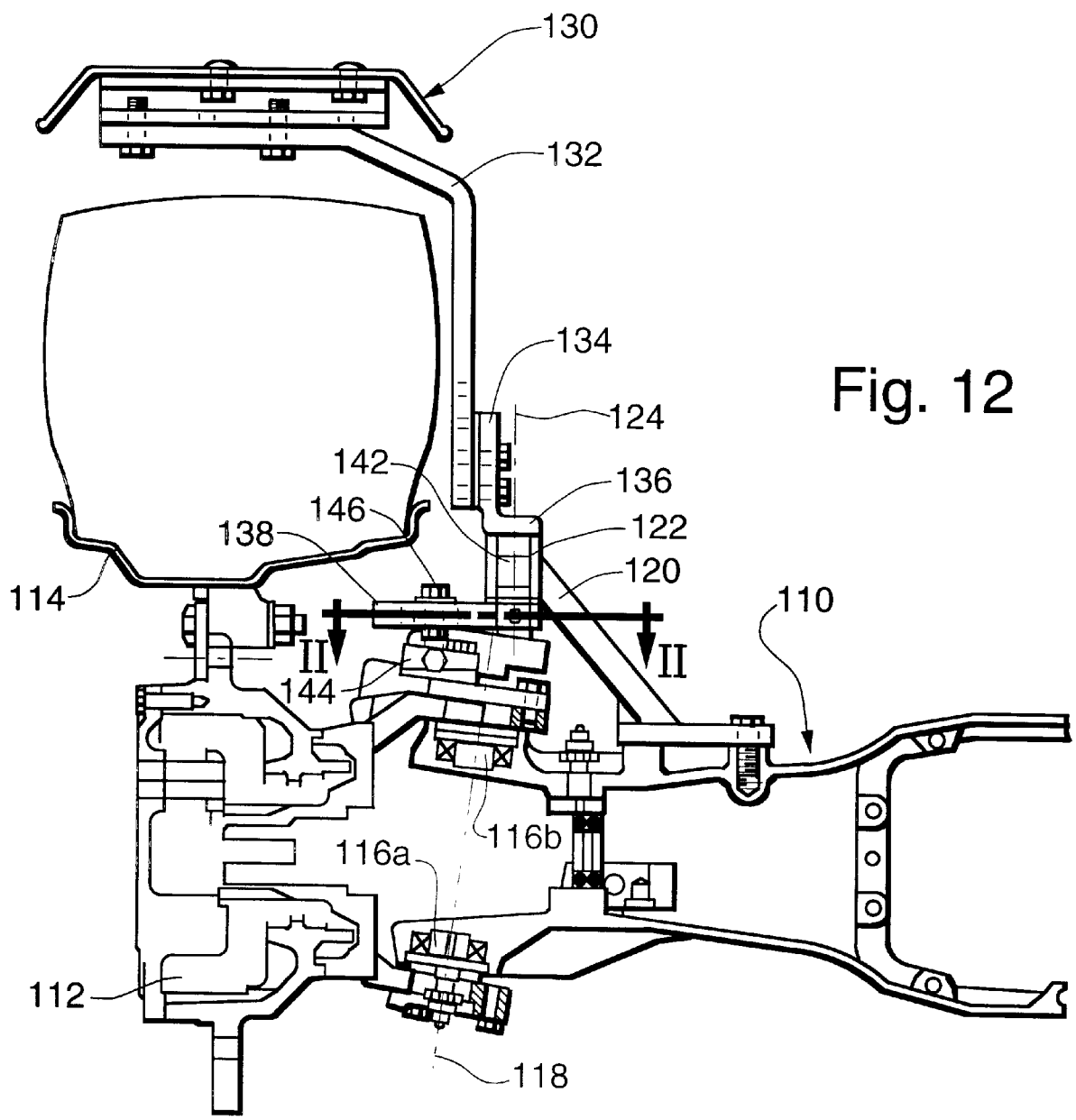
FIG. 12 is a vertical transverse section through the front axle of a tractor in accordance with a further embodiment of the invention.

FIG. 12, which represents a further embodiment of the present invention, shows part of a front axle 110 of a tractor. A hub assembly 112 of a steerable wheel 114 is mounted on king pins 116a and 116b for pivotal movement relative to the front axle 110 about a steering axis 118. The wheel 114 is steered by means of a hydraulic jack (not shown) to which hydraulic fluid is supplied by a hydraulic circuit connected to a steering wheel mounted in the driver's cab.

A bracket 120 is bolted to the front axle 110. At its free end, the bracket 120 includes a cylindrical bush 122 having a central axis 124. A mudguard 130 is mounted on a bracket 132, the lower end of which is bolted to a flange 134 on a plate 136. The plate 136 is secured to a pivot pin 142 that passes through the bush 122, so that the plate 136, the bracket 132 and the mudguard 130 can all rotate about the pivot pin 142. A lever 138 is rigidly secured to the lower end of the pivot pin 142 that projects beyond the lower end of the bush 122, so that it too rotates in unison with the mudguard 30 about the pivot pin 142.

The lever 138 is formed with a slot 148, shown in FIGS. 13 to 16, that has scalloped edges and can securely receive a coupling bolt 146 with flattened sides in any one of four positions along the slot 148. To adjust the position of the coupling bolt 146, the nuts securing it to the lever 138 are first slackened and then it is rotated to align its flattened sides with the longitudinal axis of the slot 148. The bolt may then be slid to its desired position without the need to withdraw it completely from the slot 148.

The lower end of the bolt 146 is in the shape of a ball that is received within a groove 144 in an element that is mounted immediately above the king pin 116b for rotation with the wheel hub assembly 112. As the groove 144 rotates about the steering axis 118 with steering movements of the wheel hub assembly 112, the engagement of the ball end of the bolt 146 in the groove 144 forces the lever 138 to pivot about the axis 124 of the pin 142, thereby causing the mudguard 130 to rotate about the same axis 124. However, because the axis 124 is offset from the steering axis 118, the mudguard 130 and the wheel hub assembly 112 rotate through different angles. This will be explained below by reference to FIG. 14 in which the separation of the axes 118 and 124 has been exaggerated for clarity. Furthermore, as will be described below by reference to FIGS. 15 and 16, this angle depends on the position of the bolt 146 in the slot 148.

Figure 13:
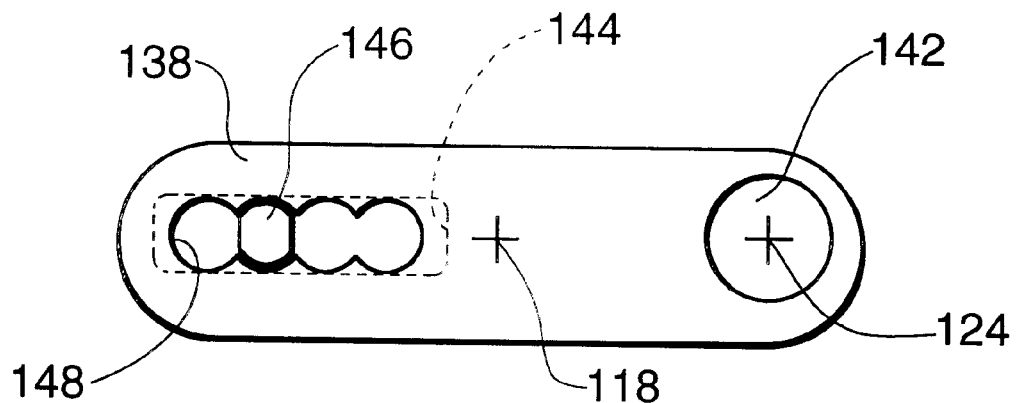
FIG. 13 is a schematic section taken along the line II—II in FIG. 12 with the steering arrangement in a central position.

In FIG. 13, the lever 138 and the groove 144 are shown in their central position when the vehicle is being driven in a straight line. The slot 144 and the lever 138 are parallel to one another and accordingly the centerline of the wheel 114 and that of the mudguard 130 are also parallel with one another. Though the bolt 146 can be fixed in any of four positions in the slot 148, the position of the mudguard 130 relative to the wheel 114 when the tractor is moving in a straight line would remain the same, regardless of the position of the bolt 146 in the slot 148.

Figure 14:
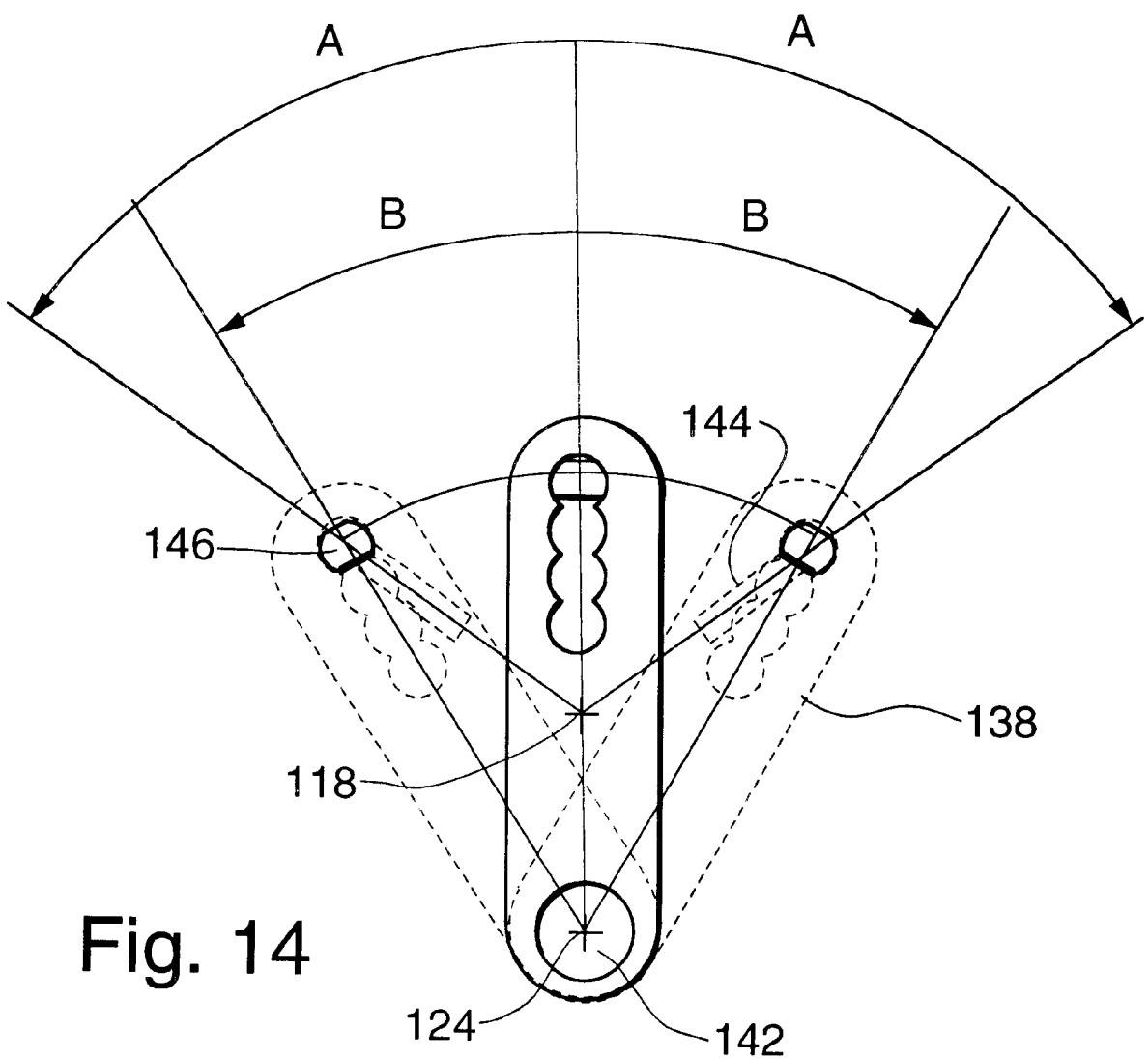
FIG. 14 is a schematic representation similar to that of FIG. 13 that illustrates the variation in the position of the mudguard with movement of the steerable wheel.
Figure 15:
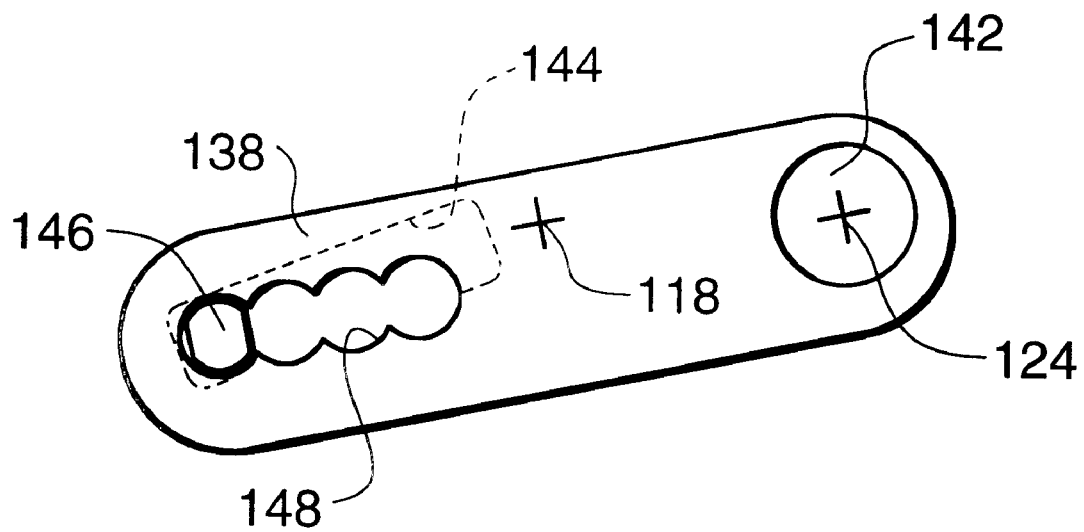
FIGS. 15 and 16 are views similar to FIG. 13 with a steering lock engaged, the two views showing the effect of moving the position of the coupling bolt in the lever that connects the mudguard for rotation in synchronism with the hub assembly of the steerable wheel.
Figure 16:
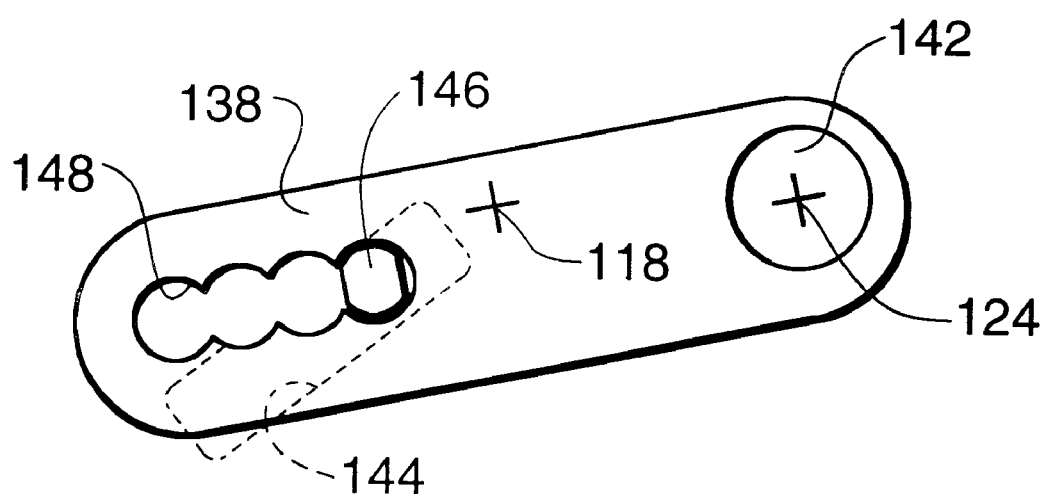

Though the mudguard and the wheel will turn at the same time about their different pivoting axes, they will not turn at the same rate through the same angle. Thus, as shown in FIG. 14, when the coupling pin 146 is at its furthest from the axis 124, while the wheel turns through a maximum angle A about the axis 118 of the king pins, the mudguard turns through the lesser angle B about the axis of the pin 142.

It will be noted that this lesser degree of rotation of the mudguard occurs in both directions of rotation of the steerable wheel. This is particularly advantageous in tractors that employ compound steering because when the wheel is turned to a full lock in one direction the rear end of the mudguard is prevented from colliding with the tractor chassis and when the wheel is turned in the opposite direction, the front end of the mudguard is prevented from colliding with any counter balance weights that are mounted on the front end of the tractor.

As the hub assembly 112 and the groove 144 turn, the extent to which the mudguard 130 is turned will depend on the position of the coupling bolt 146. This will be clear from a comparison of FIGS. 15 and 16. In these two figures, the mudguard has been rotated to the same extent about the pin 142. However, when the coupling pin is in its radially outermost position, as shown in FIG. 14, this position of the mudguard is reached after a lesser degree of rotation of the groove 144 than in FIG. 15, in which the coupling pin 146 is in its radially innermost position on the lever 138.

As a result, in any tractor, it is possible to select the position of the bolt 146 along the lever 138 to ensure that the mudguard avoids collision with the body of the tractor when the hub assembly 112 is in its position for a minimum turning circle in either steering direction. The optimum position of the coupling pin 146 will depend on the steering geometry, for example, on the distance between the steerable wheels.

The position of the ball end of the bolt 146 along the groove 144 will also vary with the steering angle and it is for this reason that the bolt 146 cannot be rigidly connected to the wheel hub assembly 112. However, alternative coupling elements may be used in place of the sliding coupling provided between the bolt 146 and the groove 144. For example, as described by reference to FIGS. 3A to 6B, a lever may be pivotably mounted at a fixed point on the hub assembly 112 and its other end may be pivotably connected to a pivot pin linking it to the lever 138. Any alternative coupling arrangement may be employed provided that tangential forces resulting from steering movement of the hub assembly 112 are applied to the lever 138 while a small element of free play is permitted in the radial direction of the lever 138.

A still further embodiment of the invention will now be described by reference to FIG. 17. In operation, this embodiment is similar to that of FIG. 12 and, to avoid unnecessary repetition, like components have been allocated the same reference numerals and will not be described again.

In the case of the present embodiment, a mounting plate 240 is rigidly secured by means of bolts 220 to the spuckle of the hub assembly 112 above the upper kingpin 116b. The mounting bracket 132 of the mudguard 130 is secured to a plate 238 that is pivotably secured to the mounting plate 240 by means of a pivot pin 224 having its axis offset from the axis of the kingpins 116a, 116b. A coupling bolt 246 projecting from the underside of the plate 238 engages in a groove 244 in the upper face of a post that projects from the front axle 110.

Figure 17:
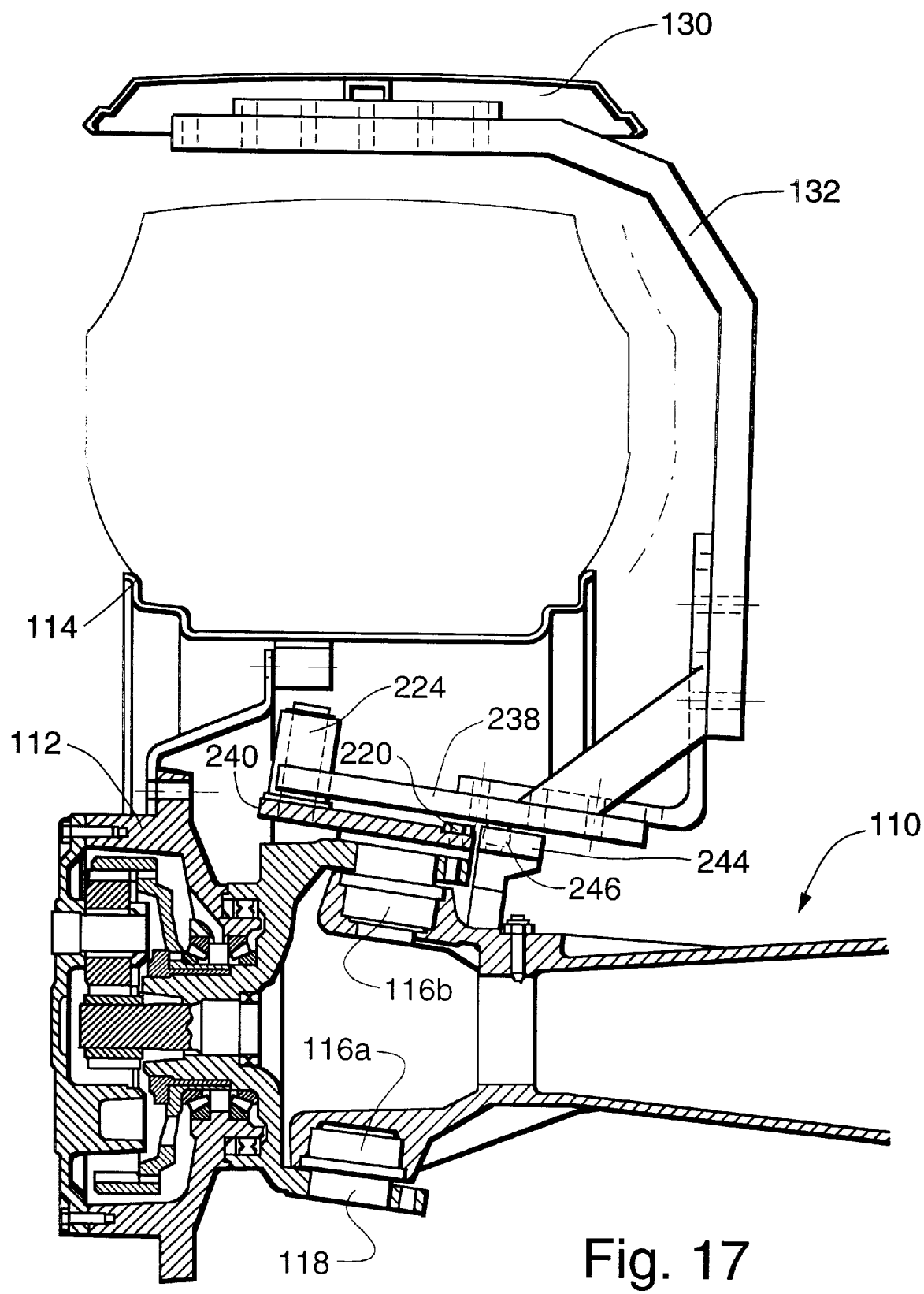
FIG. 17 is a vertical transverse section through the front axle of a tractor in accordance with a still further embodiment of the invention.

The main difference between the embodiments of FIGS. 12 and 17 is that in the case of the embodiment of FIG. 12 the mudguard pivots about a point fixed relative to the front axle and its movement is controlled by sliding engagement in a groove that moves with the hub assembly, whereas in FIG. 17 the hub is pivotable about an axis that moves with the hub assembly and its movement is controlled by engagement in a slot that is fixed relative to the front axle. The principle of operation of the two embodiments is essentially the same but the embodiment of FIG. 17 has the advantage of being more compact and more easily adaptable to accommodate wheels of different widths.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a hub assembly for a steerable wheel mounted for pivoting movement relative to an axle about a first axis, a mudguard pivotably mounted on the axle, and a linkage connected to the mudguard, to the axle and to the hub assembly for pivoting the mudguard relative to the axle in response to the pivoting of the hub assembly relative to the axle but at a different rate, so as to cause the angular position of the mudguard relative to the hub assembly to vary with the angle of the hub assembly relative to the axle, the improvement comprising:

the mudguard is pivotable relative to axle about a second axis that is laterally offset from the first axis.

2. The vehicle of claim 1 wherein the linkage includes a lever connected to pivot with the mudguard, the lever being pivotably mounted at one end on the axle and coupled at its other end to the hub assembly by means of a coupling element capable of accommodating some free movement in the longitudinal direction of the lever as the lever rotates about the second axis.

3. The vehicle of claim 2 wherein the coupling element includes a coupling bolt attached to the lever and slidably engaging in a groove fixed relative to the hub assembly.

4. The vehicle of claim 3 wherein the position of the coupling bolt along the lever is adjustable.

5. The vehicle of claim 4 wherein the base of the coupling bolt is in the form of a circle with two flats, and the coupling bolt is receivable in any one of a plurality of positions along a slot in the lever having scalloped edges.

6. A vehicle comprising:

a wheeled frame including an axle;

a hub assembly mounted on said axle for rotatably supporting a steerable wheeled pivotally movable relative to said axle about a first axis;

a mudguard pivotably mounted on said hub assembly about a second axis that is laterally offset from said first axis; and a linkage connected to said mudguard, to said axle and to said hub assembly for pivoting the mudguard relative to the hub assembly in response to the pivoting of the hub assembly relative to the axle but at a different rate of pivotal movement than said hub assembly, so as to cause the angular position of the mudguard relative to the hub assembly to vary with the angle of the hub assembly relative to the axis.

7. The vehicle of claim 6 wherein the linkage includes a lever connected to pivot with the mudguard, the lever being pivotably mounted at one end on the hub assembly and coupled at its other end to axle by means of a coupling element capable of accommodating some free movement in the longitudinal direction of the lever as the lever rotates about the second axis.

8. The vehicle of claim 7 wherein the coupling element includes a coupling bolt attached to the lever and slidably engaging in a groove fixed relative to the axle.

9. The vehicle of claim 7 wherein the coupling element includes a control link interconnecting the first lever and the axle to provide a fixed distance between a first point on said first lever and a second point on said axle to enable the pivotal movement of said mudguard to lag relative to the pivotal steering movement of the corresponding hub assembly.

10. The vehicle of claim 9 wherein said control link is pivotally connected to both said first lever and said front axle to permit a pivotal movement of said first lever relative to both said hub assembly and said axle.

11. The vehicle of claim 10 wherein said first lever includes a link pivot member projecting outwardly therefrom for pivotal connection to said control link.

12. The vehicle of claim 11 wherein each link pivot member is oriented with respect to said first axis such that said link pivot member moves away from said first axis on a turn in one direction and moves toward said first axis on a turn in an opposing direction, thereby providing different mudguard lag rates for inboard and outboard turns.

13. The vehicle of claim 12 wherein said link pivot member is provided with a lost motion slot through which said control link is connected to permit said mudguard to pivot with the hub assembly without effecting any mudguard lag relative thereto for a predetermined amount of steering movement of said hub assembly.

14. The vehicle of claim 13 wherein said axle is provided with an axle housing pivot to facilitate the pivotal connection of said control link thereto.

15. The vehicle of claim 13 wherein the pivotal movement of the mudguard relative to the hub assembly is such that each steerable wheel moves closer to the vehicle centerline than the corresponding mudguard on both inboard and outboard turns.

* * * * *